May 19, 1959     D. C. HEITSHU ET AL     2,887,167

HITCH DEVICE

Original Filed March 20, 1953     4 Sheets-Sheet 1

INVENTORS.
DANIEL C. HEITSHU
BERNARD F. VOGELAAR
BY
ATTORNEYS

May 19, 1959  D. C. HEITSHU ET AL  2,887,167
HITCH DEVICE
Original Filed March 20, 1953  4 Sheets-Sheet 2

FIG. 2
FIG. 10

*INVENTORS.*
DANIEL C. HEITSHU
BERNARD F. VOGELAAR
BY
ATTORNEYS

May 19, 1959  D. C. HEITSHU ET AL  2,887,167
HITCH DEVICE

Original Filed March 20, 1953  4 Sheets-Sheet 3

*INVENTORS.*
DANIEL C. HEITSHU
BERNARD F. VOGELAAR
BY
*ATTORNEYS*

May 19, 1959      D. C. HEITSHU ET AL      2,887,167
HITCH DEVICE Original Filed March 20, 1953      4 Sheets-Sheet 4

*INVENTORS.*
DANIEL C. HEITSHU
BERNARD F. VOGELAAR
BY

ATTORNEYS

United States Patent Office 2,887,167
Patented May 19, 1959

2,887,167

HITCH DEVICE

Daniel C. Heitshu and Bernard F. Vogelaar, Moline, Ill., assignors, by mesne assignments, to Deere & Company, a corporation of Delaware Continuation of application Serial No. 343,722, March 20, 1953. This application June 6, 1956, Serial No. 589,797

28 Claims. (Cl. 172—9)

This application is a continuation of application Ser. No. 343,722, filed March 20, 1953, now abandoned, and the invention relates generally to agricultural implements and more particularly to control mechanism for implements of the type that are supported on or connected with a farm tractor, both for operation, as in plowing or the like, or for transport.

The object and general nature of the present invention is the provision of new and improved control mechanism of the hydraulic type, wherein a ram unit, such as but not limited to a remote cylinder normally associated with and carried by the tractor, may be connected between the tractor and the implement and automatically controlled for changing the tilt of the implement in a fore-and-aft direction relative to the tractor so as to compensate for tilting of the latter as the tractor passes over uneven ground. Tractors of the type having flexibly connected remote power cylinders or ram units are in relatively wide use today, and it is a further feature of this invention to provide a control mechanism whereby such ram units may be utilized in the automatic control of the present invention. Further, it is a feature of this invention to provide means for disconnecting the automatic control whenever desired and so place the remote ram unit under a separate control.

Another important feature of the present invention is the provision of an improved implement control system incorporating two hydraulic ram units, one connected to lift an associated implement into a transport position and the other connected and automatically operated to effect a pitch compensation. A further feature of this invention is the provision of an improved automatic implement control making use of a tractor of the type having a main lifting hydraulic ram unit and an auxiliary ram unit, with means acting through the latter unit for automatically tilting the implement in a direction to facilitate movement of the latter out of the ground and toward a transport position. In this connection it is a further feature of this invention to provide means whereby the tilting of the implement, to facilitate the emergence of the ground-working means of the implement from its ground-penetrating position, is subsequently reversed by the movement of the implement and associated parts into its fully raised position so as to improve the transport characteristics of the tractor and implement.

These and other objects and advantages of the present invention will be apparent to those skilled in the art after a consideration of the following detailed description, taken in conjunction with the accompanying drawings, in which.

The means chosen to illustrate the principles of the present invention is shown as a tractor and implement outfit, comprising a tractor 10, an implement 11 and hitch means or draft linkage 12 of the type commonly referred to as a three-point hitch. In the form of the invention shown in the drawings, the hitch 12 includes a pair of lower links 13 operating generally under tension and an upper link 14 operating generally under compression. The implement 11 may be substantially any of the more or less conventional ground-engaging or ground-working types, and for purposes of illustration is shown in the accompanying drawings as including a frame 16 to which one or more plow bottoms 17 are connected. If desired, the implement may carry or include a part of the associated hitch structure, such as a mast 18 rigid with the frame 16. The rear ends of the lower links 13 are connected by ball-type connectors 19 with the lower portion of the standard or mast 18 and the rear end of the upper link 14 is connected to the upper portion of the mast 18 by a similar ball-type connector 21. The forward ends of the lower or tension links 13 are connected with the drawbar support 22 of the tractor by ball-type connectors 23 which may be similar to or identical with the ball-type connectors mentioned above.

The tractor 10 shown has a hydraulic power lift and load-responsive control embodying a transverse rockshaft 25 having a pair of lift arms 26 connected to the ends thereof to be raised and lowered by rocking of said shaft. The outer ends of the arms 26 are connected through lift links 27 with the tension links 13 of the three-point hitch 12, whereby rocking of the shaft 25 acts to raise and lower the implement 11. Carried within the body of the tractor is a main ram unit 28, shown in Fig. 2 as including a cylinder 29 in which a piston 30 is movable in a generally fore-and-aft direction. The piston 30 is connected by a piston rod 31 with an arm 32 that is fixed to the generally central portion of the transverse rockshaft 25. Valve mechanism or actuator means 33 controls the flow of fluid under pressure to the cylinder 29 from a power source such as a hydraulic pump 34 or other suitable source of fluid pressure, and the valve means 33 is under the combined control of a manually operated control handle or member 35 that is movable through two ranges, one constituting a depth-adjusting range and the other a lifting range, and a follow-up linkage indicated generally at 36 and shown as placing the valve means 33 under the combined control of the control handle 35 and two other parts, one including an arm 37 fixed to rock with the shaft 25 and the other part 38 shown as a part of a load-control device indicated generally by the reference numeral 40.

The valve means 33 includes a casing 45 (Fig. 2) having therein a bore 46 in which a valve member 47 is slidable. The valve casing 45 communicates with the inner or closed end of the cylinder 29 through a passageway 48 in which a check valve 49 is urged toward a closed position by a spring 51 and includes a plunger 52 by which force may be exerted thereon to open the same. The bore 46 includes a transverse opening through which the inner end of the plunger 52 extends adjacent to a cam 54 formed on the inner end of the valve member 47. The valve member 47 is formed with an outer cylindrical section 55, shiftable through sealing means 56 carried by the casing 45, and an inner cylindrical section 57. In the neutral or closed position of the valve member 47, the cylindrical section 57 closes off the end of the bore or passageway 48. A high-pressure line or conduit 59 leads from the pump 34 into a bore 61 formed in the valve housing 45 and which at its inner end communicates with a chamber 62 formed by a reduced portion of the valve member 47. When the valve member 47 is moved to the left, the chamber 62 is brought into communication with the passageway 48, whereupon fluid under pressure from the line 59 flows through the chamber 62 and past the check valve 49 into the cylinder 29, thereby extending the same and rocking the rockshaft 25 in a clockwise direction (Figure 1), thereby raising the outer or rear end of the lift arms 26. When the valve member 47 is moved in the opposite direction, the cam 54 engages the plunger 52 and moves it inwardly, thereby opening the check valve 49 and permitting fluid to flow from the cylinder 29 through the passageway 48, an axial passageway 63 in the inner end of the valve member 47 and into a sump 64 formed in the cylinder housing, and from the sump 64, the hydraulic fluid may flow through a discharge line 65 to the sump or reservoir 66 of the pump 34.

The tractor is also equipped with a power-operated unit, here a double-acting ram unit 70 flexibly connected with the tractor through a pair of hose conduits 71 leading into a valve box or valve housing 72 in which is disposed motor valve mechanism 73 or actuator means by which the flow of fluid to and from opposite ends of the ram unit 70 is controlled. The flexibly connected ram unit 70 may be used for a plurality of purposes. For example, the remote unit 70 and the rockshaft 25, actuated by the main ram unit 28, can be used simultaneously to operate two independent functions on a single implement, or they may be used to operate independent functions on a combination of implements. According to the present invention, however provision is made whereby the remote or auxiliary ram unit 70 is used to control the tilting of the implement in a fore-and-aft direction so as to compensate correctively for tilting of the implement when the tractor passes over uneven ground, as over a ridge or through a swale or depression, in addition to the foregoing uses. To this end the ram unit 70 constitutes the top link 14 in the preferred embodiment of the invention. The valve means 73 may be, and preferably is, incorporated in the same housing as the valve means for the main ram unit 28. However, for purposes of illustration in Figure 2, the valve means 73 is shown as separate from the cylinder 29 and associated valve means 33.

Figures 2, 10:
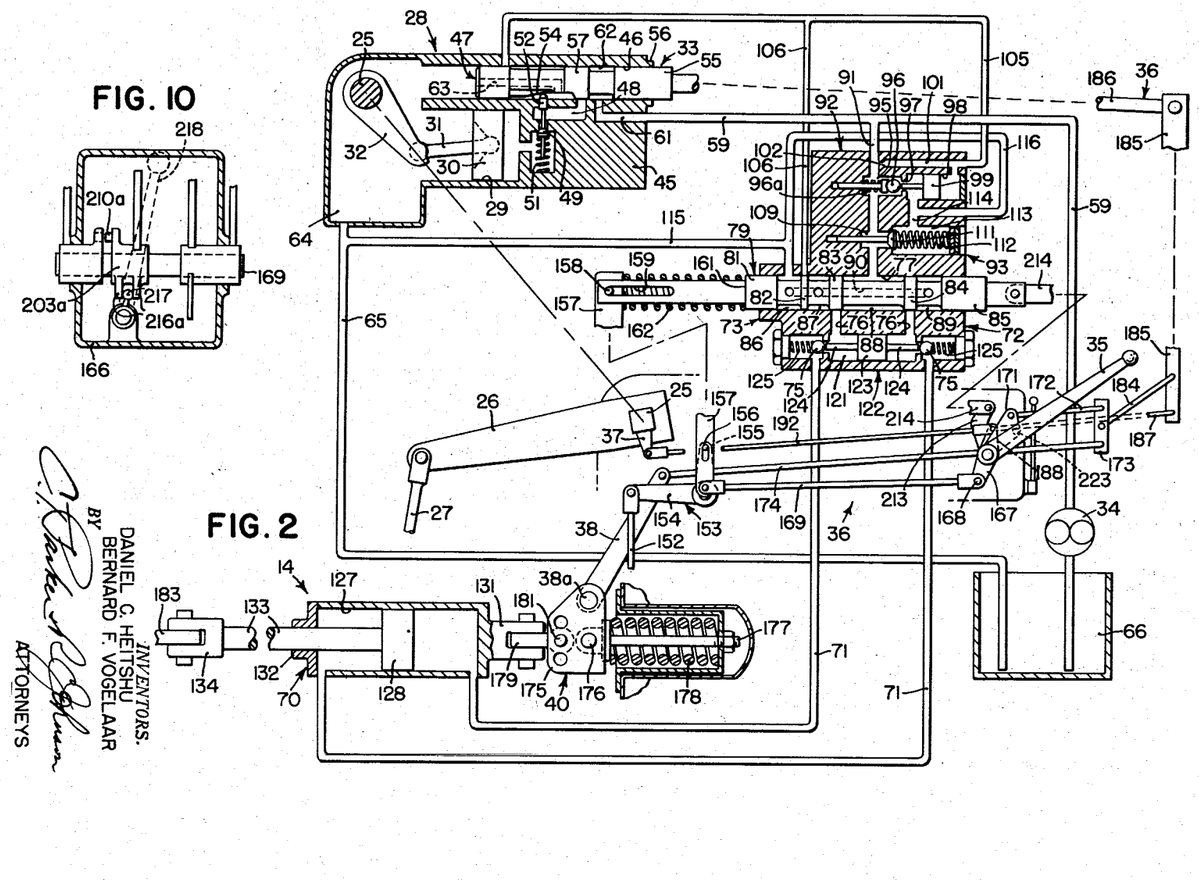
Figure 2 is an enlarged schematic view of the valve means controlling the main and auxiliary ram units.
Figure 10 is a view similar to Figures 7 and 8 and shows a modified form of selector mechanism.

Referring now to Figure 2, the inner ends of the conduits 71 communicate with a pair of hydraulically controlled check valves 75 and cross passages 76 with a generally cylindrical valve chamber 77 formed in a casing 72. Disposed within the chamber 77 for sliding movement is a cylindrical valve member 79 having spaced cylindrical lands 81, 82, 83, 84 and 85 and intervening grooves 86, 87, 88 and 89. The grooves 86, 87 and 89 are in communication with one another through an interior axial bore 90 and associated cross passages. The valve means 33, controlling the main ram unit 28, constitutes a first valve means, and the valve means 73, controlling the remote ram unit 70, constitutes a second valve means.

Hydraulic fluid for operating the remote unit 70, under the control of the valve member 79, is derived from the pump 34 through a high-pressure conduit 91 that is in communication with the high-pressure line 59. The passageway 91 leads into a demand or unloading valve unit 92 and past a relief valve 93 into communication with the central chamber 88 of the valve member 79. The demand valve unit 92 comprises a chamber 95 in which a spring-pressed ball valve 96 controls a valve seat 97 surrounding a passage that leads into a cylinder 98. Disposed in the cylinder 98 is a piston 99 having a stem that extends through the valve seat 97 into contact with the ball valve 96. The end of the cylinder 98 at the other side of the piston 99 communicates with the high-pressure line 91 through a short passageway 101 and a restriction or orifice 102. The passageway 101 is also in communication with a portion of the valve chamber 46 of the valve means 33 through a passageway 105. Another passageway 106 leads from the passageway 105 to a portion of the valve chamber 77 adjacent the land 82.

The relief valve unit 93 includes a chamber 109 incorporated in the passageway 91 and closed by a valve member 111 loaded by a relatively strong spring 112 disposed in a spring chamber 113 that communicates with the inner end of the cylinder 98 through a short passageway 114 in communication with the sump 66 through lines or conduits 116, 115 and 65. If desired, the chamber 113 may be vented directly to the sump 66.

The two valve means 33 and 73 when in their respective closed or neutral positions (Figures 1 and 2) prevent flow of fluid to either the main ram unit or the auxiliary ram unit. Pressure in the line 59 builds up behind and moves the demand valve piston 99 to open the ball valve 96. This reduces the pressure in the line 91 since fluid can flow past the valve 96 through the valve seat 97 and the passageways 114, 116 and 115 to the sump. Since the diameter of the piston 99 is appreciably larger than the valve 96, the residual pressure in the lines 59 and 91 and in the right end of the cylinder 98 is sufficient to maintain the demand valve 96 open, thereby permitting the pump 34 to idle. If, for example, the valve member 47 should be moved to the left (Figures 1 and 2), or if the valve member 79 should be moved in either direction out of its neutral position, the passageways 105 and 106, communicating with the outer end of the demand cylinder 98, are opened to the low-pressure side of the system, whereupon fluid will flow from behind the piston 99 as the spring 96a acts to close the ball valve 96 against the seat 97. This prevents any further flow of fluid through the passageway 114 to the sump and operating pressure is built up in the system and either or both of the ram units are placed in operation. Assuming, for example, that the valve member 79 is moved to the left fluid under pressure is directed into the central groove 88 of the valve means 73 and flows thence through the left-hand passageway 76 into the left-hand chamber 121 of the hydraulic check valve unit 122. This unit includes a central piston 123 carrying a pair of stems 124 adapted to act, respectively, on the ball check valves 75, each of which is urged toward its closed position by a spring 125. The diameter of the piston 123 is substantial, and therefore, since the valve 79 has been moved to the left, the pressure exerted by the fluid in the chamber 121 acts to shift the piston 123 to the right, thereby opening the right-hand check valve 75 and permitting fluid to flow from the left end of the auxiliary ram unit 70. At the same time, fluid under pressure flows past the left-hand check valve 75 and into the right end of the unit 70.

This unit or motor includes relatively movable members in the form of a cylinder 127 and a piston 128, all per se of conventional construction, and one end of the cylinder carries an apertured attaching lug 131 and the other end has a seal 132 through which a piston rod 133 passes. The outer end of the piston rod 133 carries an apertured attaching lug 134.

If the valve member 79 is moved in the other direction, then pressure is exerted on the fluid in the right end of the hydraulic check valve unit 122, forcing the piston 123 to the left and opening the left-hand check valve 75 while fluid under pressure is being directed past the right-hand check valve 75 and through the associated conduit 71 into the left-hand end of the cylinder 127. If the valve member 47 of the valve means for the main ram unit 28 is moved to the right, the cam 54 acts through the plunger 52 to open the check valve 49 whereupon fluid may flow from the inner end of the cylinder 29 through the passageway 48 and axial passageway 63 into the sump 64 and thence through the low-pressure line 65, whereupon the weight of the implement or other parts, such as the plow 11 acts through the arms 26 to force the piston 30 inwardly, thereby lowering the ground-engaging means of the implement into operation.

Figures 1, 9:
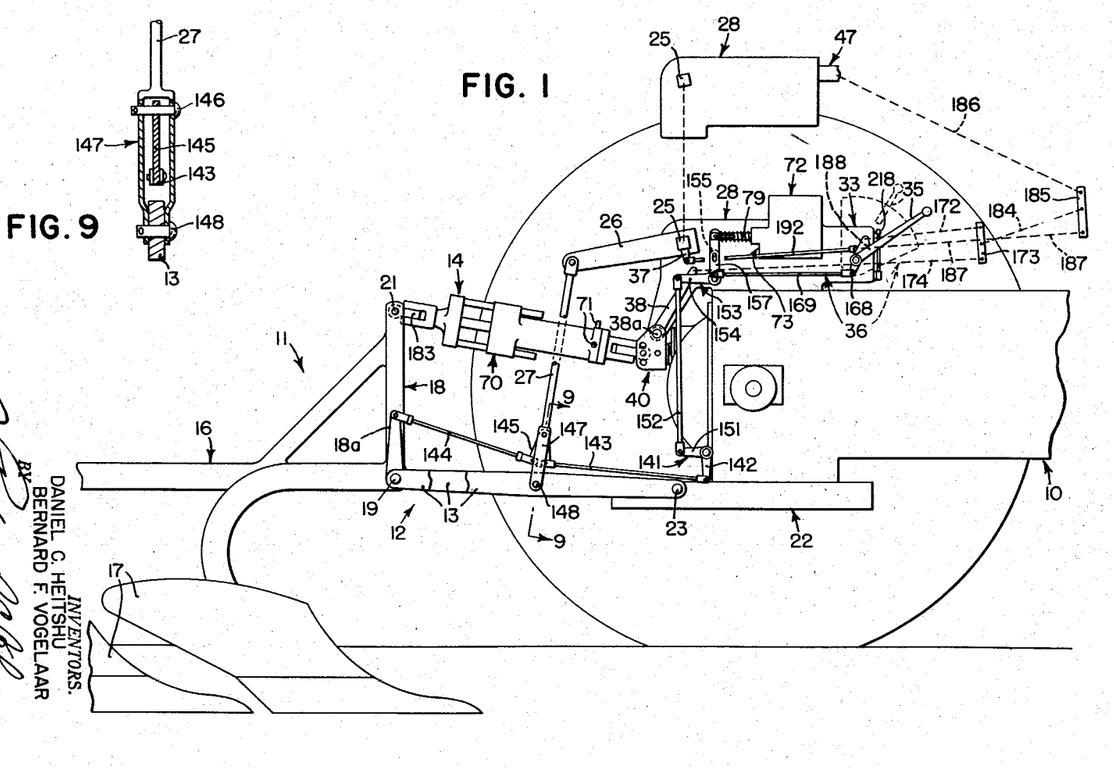
Figure 1 is a fragmentary side view showing an implement and tractor combination in which the principles of the present invention have been incorporated, the implement and associated parts being shown in the positions they occupy during normal operation at an average depth, the implement itself being in the form of a two-bottom plow, for purposes of illustration.
Figure 9 is a fragmentary sectional view taken generally along the line 9—9 of Figure 1.
Figure 5:
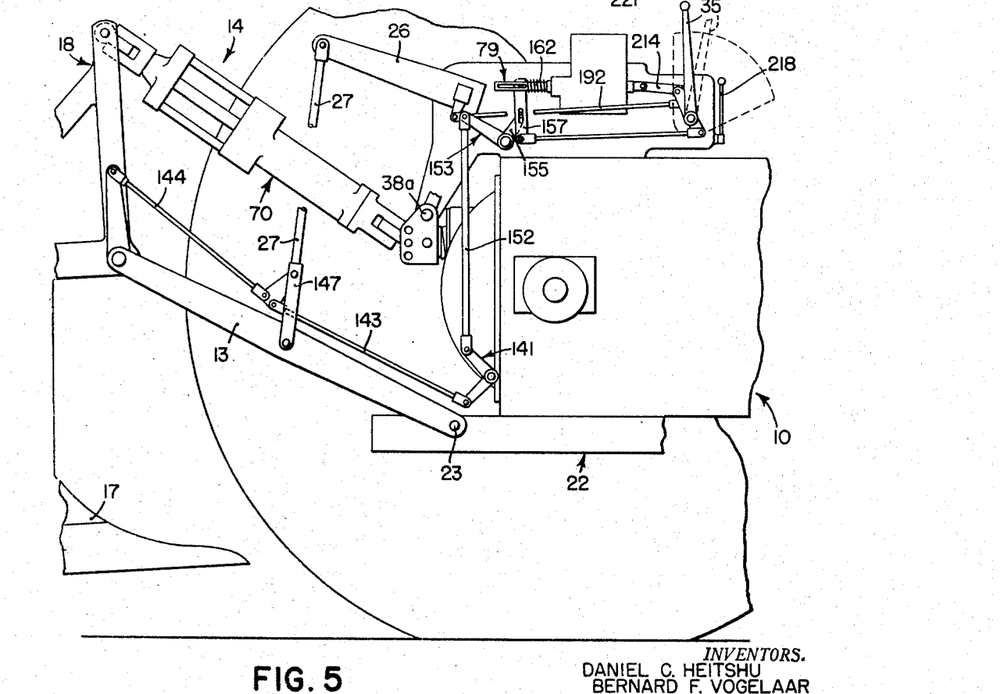
Figure 5 is a view similar to Figure 1, showing the positions the parts occupy when the implement is being raised and approaches its transport position, the implement being shown in an upwardly and forwardly tilted position to facilitate emergence of the ground-working means from the ground.

The follow-up linkage 36, referred to briefly above, and associated parts for controlling the main or first valve means and the second or auxiliary valve means includes a bell crank 141 having one arm 142 connected through a pair of links 143 and 144 with an upwardly extending signal part or auxiliary mast 18a fixed to and forming generally a part of the mast 18 and/or the frame 16 of the implement 11. As best shown in Figures 5 and 9 the adjacent ends of the links 143 and 144 are supported by a generally triangular link member 145 that is supported for rocking movement, as on a pin 146, from a lower bifurcated portion 147 of the associated lift link 27. The lower portions of the bifurcated section 147 are pivotally connected to the associated tension link 13 by a cross pin 148. The other arm 151 of the tractor-carried bell crank 141 is connected by a link 152 with a valve-actuating part in the form of a second bell crank 153 supported in any suitable way for rocking movement on the tractor. The bell crank 153 constitutes a part that is movably mounted on the tractor, and it is connected with the implement 11 through parts 152, 141, 143, and 144, whereby the bell crank part 153 moves whenever the implement is tilted relative to the tractor, as will be clear from Figure 1. The arm 154 of the bell crank 153 receives the upper end of the link 152 and the other arm 155 of the bell crank 153 carries a pin 156 upon which an equalizing lever 157 is rockably mounted. When the bell crank 153 is held against movement, the pin 156 constitutes a fulcrum for the equalizing lever 157. If desired, these parts may be disposed within the housing of the tractor, such as the transmission housing or the rear axle housing. The upper end of the equalizing lever 157 carries a pin 158 received in a slot 159 in the rear end of the valve member 79 and a shoulder 161 on the valve member receives a spring 162 which acts at its other end against the upper end of the equalizing lever 157, normally maintaining the pin 158 in the rear end of the slot 159. The bell crank 141, links 143 and 144, link 152, and bell crank 153, with associated parts, make up an operating linkage that moves in response to generally vertical movement of the implement relative to the tractor, and the equalizing lever 157 and associated parts serve as means connecting said operating linkage with the valve 79 which operates the ram unit 70 that tilts the implement. More specifically, the bell crank 141 is a part that moves in response to tilting of the implement relative to the tractor, and the parts 152, 153, and 157 connect the bell crank 141 with the valve means 79.

Figure 3:
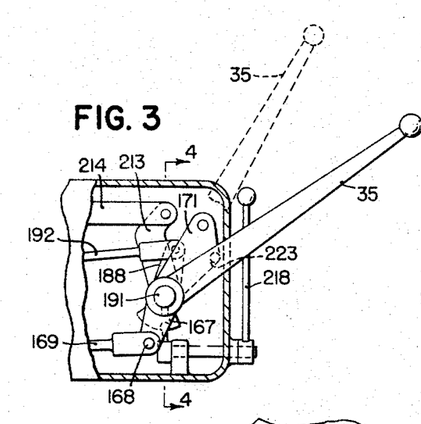
Figure 3 is an enlarged side view of the disconnectible means whereby the remote cylinder control handle may be disconnected from the valve means for the auxiliary ram unit and the latter placed under the control of the hand lever for the main ram unit and the other controls associated therewith.
Figure 4:
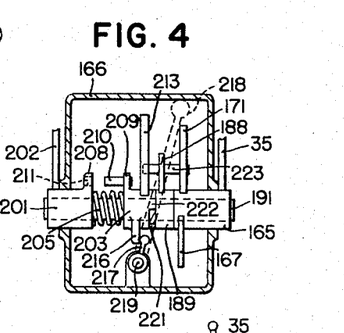
Figure 4 is a sectional view taken generally along the line 4—4 of Figure 3.

As best shown in Figures 3 and 4, the hand lever or control handle 35 for the main valve means 33, controlling the main ram unit 28, is fixed to the outer end of a sleeve 165 mounted for rocking movement in a casing or housing 166. The inner end of the sleeve, within the housing 166, carries a lower arm 167 fixed thereto and having a pivot 168 connected to the forward end of a link 169. The rear end of the link 169 is pivotally connected to the lower end of the equalizing lever 157, as best shown in Figure 2, and when the link 169 is held against movement it constitutes a fulcrum for the equalizing lever 157. A second arm 171 is also fixed to the inner end portion of the sleeve 165 and is apertured to pivotally receive the rear end of a link 172, the forward end of which is pivotally connected with a second equalizing lever 173, the lower end of which is pivotally connected to the forward end of a link 174. The rear end of the link 174 is pivoted to the upper end of the upwardly extending part 38 that forms the movable portion of the draft-responsive or load-responsive unit 40.

This unit comprises a bracket 175 to which the part 38 is fixed. The lever that comprises the rigidly connected parts 38 and 175 is pivoted on the tractor by means of a pivot member 38a (Figures 1 and 2), and the bracket 175 is pivotally connected at 176 to the outer or rear end of a plunger 177 that is carried on the tractor for fore-and-aft movement relative thereto, the plunger being urged rearwardly by a heavy draft-resisting spring 178. The bracket 175 is apertured at a number of points so as to provide for selective reception of the forward end of the auxiliary ram unit 70, which here forms the principal portion of the upper compression link 14 mentioned above. Preferably, the connection between the forward end 131 of the ram unit 70 and the bracket 175 is made by a swivel member 179 connected by a pin 181 to one of the openings in the bracket 175. The rear end of the unit 70 is similarly connected by a swivel member 183 to the upper end of the implement mast 18.

Returning to the follow-up linkage, indicated generally at 36, the second equalizing lever 173 is connected by a link 184 to a third equalizing lever 185. The upper end of the third equalizing lever 185 is connected through a link 186 with the main ram unit valve member 47, and the lower end of the equalizing lever 185 is connected through a link 187 with an arm 188 carried by a short sleeve 189 rockably mounted on a shaft 191 supported axially of the sleeve 165 and movable relative to the latter. Extending generally in alignment with the link 187 is another link 192 connected at its forward end to the arm 188, the rear end of the link 192 being connected with the arm 37 that is fixed to the power lift rockshaft 25. While the equalizing levers 173 and 185 are shown only diagrammatically in the accompanying drawings, it will be understood that these levers may be supported on or within the tractor by any suitable means that provides for their floating movement. With respect to the lever 173, it will be seen that the position of this lever depends upon, first, the position of the control handle 35 and its associated arm 171 and, second, the position of the draft-responsive arm 38. Next, considering the other or third equalizing lever 185, it will be seen that the position of this part depends upon, first, the position of the second equalizing lever 173, to which the equalizing lever 185 is connected through the link 184 and, second, the position of the rockshaft 25, through the connecting links 187 and 192 that connect the equalizing lever 185 with the arm 37. Considering the equalizing lever 157, that controls or aids in the controlling of the valve means for the auxiliary ram unit, it will be seen that the position of the valve member 79 depends upon, first, the position of the bell crank 153 and, second, the position of the control handle 35 to which the arm 167 pivotally receiving the link 169 is connected.

The operation of the parts thus far described will now be explained in detail.

Referring first to Figure 1, which shows the implement in operating position at an average working depth and with the outfit moving over substantially level land, if the front end of the tractor should encounter and start to pass up a rise or ridge, the tractor as a consequence thereof pitching upwardly relative to the implement, the implement 11 is free to move upwardly with respect to the tractor, since the main ram unit is a one-way acting device and the connection between the piston 29 and the piston rod 31 is such that the piston rod may move freely away from the piston. This movement of the implement relative to the tractor occurs momentarily about a virtual pivot point well forward on the tractor, and in addition the implement moves relative to the draft linkage so that the main and auxiliary mast portions 18 and 18a cause rearward movement of the links 143 and 144 with respect to the tractor. This rearward movement acts through the bell crank arm 142 to swing the bell crank 141 in a clockwise direction, lifting the link 152. This movement, in turn, swings the bell crank 153 in a clockwise direction, shifting the equalizer pivot pin 156 generally forwardly. Since the hand lever 35 is stationary, the rear end of the link 169 serves as a fulcrum for the equalizing lever 157, whereby the forward movement of the pin 156 just mentioned serves to shift the valve member 79 forwardly, the equalizing lever 157 acting through the spring 162. The forward movement of the valve member 79 first causes the demand valve 96 to close, as described above, whereupon fluid under pressure is delivered past the right-hand check valve 75 and into the associated pressure line 71 to the rear end of the cylinder 127 to move the piston 128 forwardly, the pressure in the right-hand hydraulic check valve unit 122 serving to shift the valve piston 123 to the left and unseat the left-hand check valve 75. Thereupon the auxiliary ram unit 70 is retracted, which shortens the effective length of the upper link 14, thus tilting the implement 11 downwardly and forwardly. As the auxiliary ram unit 70 is retracted to tilt the implement as just described, the links 143 and 144 are shifted forwardly, which reverses the movement of the bell cranks 141 and 153, whereupon the valve member 79 is returned to its neutral position, terminating tilting of the implement and leaving the same in a position of tilt, relative to the tractor, that substantially exactly compensates for the upward pitch of the front end of the tractor.

If the rise is long so that the plow begins moving up the rise while the tractor also continues to move up the rise, the parts are automatically returned to a position corresponding to that shown in Figure 1 where both the plow and implement are operated along substantially the same plane, although this plane would not be horizontal but would be inclined as the outfit continues up the rise.

If the front end of the tractor should start to move into a depression, or as the outfit reaches the top of the rise and the front end of the tractor starts to drop, substantially the reverse action takes place. That is, when the front end of the tractor drops the plow is momentarily raised bodily and so momentarily operates at a position of reduced depth. However, this decreases the draft and the consequent expansion of the spring 178 shifts the bracket 175 and arm 38 about the pivot 38a in a clockwise direction, thus exerting a thrust through the link 174 and swinging the equalizing lever 173 in a counterclockwise direction, which shifts the other equalizer lever 185 in a clockwise direction, and this results in the link 186 being shifted in a forward direction and moving the main ram unit valve member 47 to the right. This opens the check valve 49 and permits the fluid to flow from the cylinder 29 through the passage 48 and the central bore 63, which is connected with the passage 48 when the valve 47 is moved forwardly, the fluid then flowing to the sump or reservoir and as a consequence the piston 30 moves forwardly, permitting the implement to lower. However, as the implement lowers, a forward thrust is exerted through the links 143 and 144 against the lower arm 142 of the bell crank 141, turning the latter in a counterclockwise direction. This movement rocks the bell crank 153 also in a counterclockwise direction and thus shifts the auxiliary ram unit valve member 79 in a rearward direction. As soon as the cylindrical section 82 clears the lower end of the passage 106, fluid is dumped from behind the demand valve piston 99, which causes the demand valve 96 to close. Fluid under pressure is then directed through the passage 91, the chamber 88, the left-hand bore 76 and associated conduit 71 into the forward end of the pitch-compensating cylinder 127. This extends the auxiliary ram unit 70 and thus tilts the implement in a direction to compensate for the downward pitching of the front end of the tractor under the conditions assumed. The parts are so arranged that by the time the implement reaches a position generally parallel to the ground surface, the valve member 47 is automatically returned to its neutral position, the implement and tractor again taking the relative positions shown somewhat diagrammatically in Figure 1.

The control mechanism of the present invention thus maintains the implement in substantially parallel position with respect to the ground surface even though the front end of the tractor pitches upwardly or downwardly as when entering onto or starting across a rise or a depression, or when passing from a rise or depression onto level land again.

In a similar way the control mechanism of this invention serves to maintain the implement in substantially a parallel position with respect to the ground surface notwithstanding changes in the depth of operation of the ground-working means, as a consequence of manual adjustment of the control handle 35. For example, assume that it is desired to operate at a shallower depth than is indicated in Figure 1. To reduce the depth of operation, the operator shifts the control handle 35 from the position shown in full lines in Figure 1 to, for example, the position shown in dotted lines. The initial movement of the hand lever 35 from the full-line position to the dotted-line position (Figure 1) acts through the link 172 to swing the equalizer lever 173 in a counterclockwise direction and this, in turn, acts through the link 184 against the equalizer lever 185 to shift the link 186 rearwardly, thus shifting the main ram unit control valve 47 rearwardly. This directs fluid under pressure through the passageway 48 (Fig. 2) into the front end of the cylinder 29, which causes the lift arms 26 and rockshaft 25 to rock in a clockwise direction, thus raising the implement. When the control handle 35 is moved from its full-line position to its dotted-line position, in addition to controlling the valve means for the main ram unit 28, it also acts through the link 169 to swing the equalizer lever 157 in a counterclockwise direction. The resulting movement of the upper end of the lever 157 shifts the auxiliary valve member 79 rearwardly a distance sufficient to cause fluid under pressure to be directed into the front end of the cylinder 127, thus causing the unit 70 to extend, tilting the points of the plow bottoms upwardly and thus facilitating movement of the plow to a position of a shallower depth of operation. However, as the plow moves to its position of reduced depth, as a consequence not only of the upward tilting of the front ends of the plow bottoms, but also by virtue of the upward lifting exerted against the plow by the upward rocking of the arms 26, a rearwardly directed pull is exerted through the links 143 and 144 against the bell crank 141, causing the latter and the upper bell crank to be shifted in a clockwise direction, this movement shifting the pivot pin 156 forwardly and moving the valve member 47 forwardly back to its neutral position. Thus, as a result of raising the implement relative to the tractor, the implement is tipped or tilted backwardly by an amount sufficient to cause it to remain in a substantially parallel position with respect to the ground surface when at a reduced depth of operation. The reverse action takes place if, for example, the implement should be lowered into a position of deeper plowing. In other words, briefly, whenever the implement moves downwardly relative to the tractor, the front end of the implement is tilted downwardly, and whenever the implement is moved upwardly relative to the tractor, the front end is tilted upwardly, as compared with the position the implement would occupy without the pitch compensation of the present invention.

Figure 6:
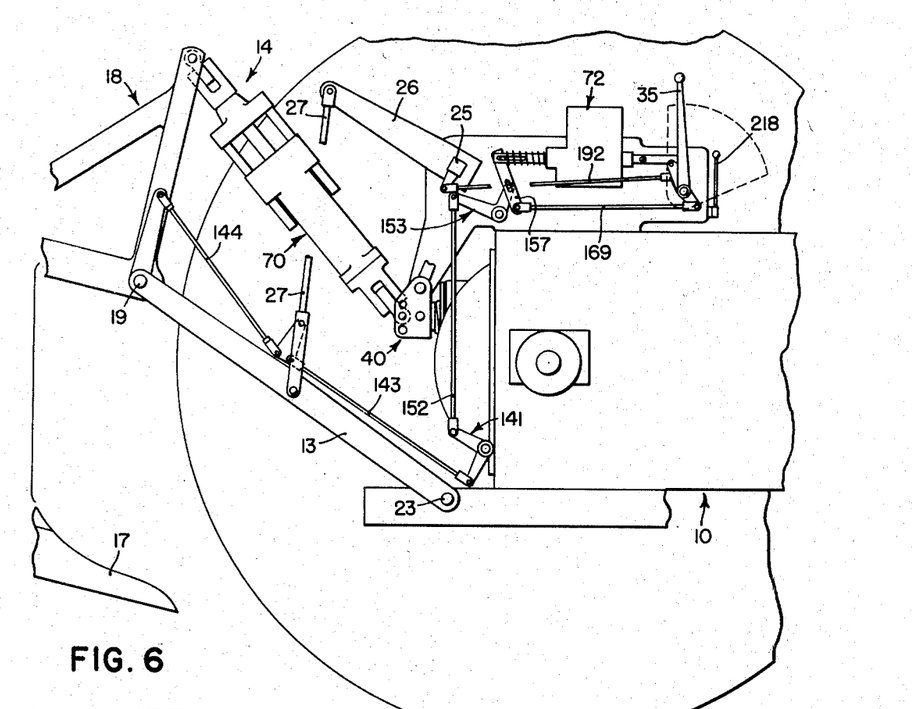
Figure 6 is a view similar to Figure 5, showing the implement in its completely raised or transport position.

It is not always desirable, however, to have this action take place in this manner. For example, when raising the implement into a transport position, it is desirable during the lifting from the soil to have the same tilted upwardly at its front end (Fig. 5), particularly in the case of plows, to facilitate emergence of the tool means from the ground without having it bodily lifted. In this way, the lifting effort required to raise the implement into its transport position is materially reduced. It is also desirable to have the implement tilted downwardly at its front end when transport position is reached (Fig. 6). The means by which this action is secured automatically will now be described.

Referring first to Figures 3 and 4, it will be observed that the end of the supporting shaft 191 opposite the sleeve 165 receives a third sleeve 201 having a control handle 202 fixed thereto outside the casing 166. A fourth sleeve 203 is mounted on the shaft 191 and is slidable thereon toward and away from the sleeve 201. A spring 205 is disposed between the sleeve 201 and 203 so as to urge them toward their separated positions (Figure 4). Each of these sleeves carries an apertured lug, the lug on the sleeve 201 being indicated at 208 and the other lug being indicated at 209. The latter lug carries a pin 210 suitably fixed thereto. The other lug 208 is apertured, as at 211, to receive the pin 210 when the sleeve 203 is moved toward the other sleeve 201. An arm 213 is carried by the laterally shiftable sleeve 203 and pivotally receives a link 214 that is connected to the forward end of the auxiliary ram unit controlling valve member 79 (Fig. 2). The lower portion of the laterally shiftable sleeve 203 also carries a flange 216 that is adapted to be engaged by an arm 217 that is connected to move directly with a selector lever 218, the latter being fixed to a shaft, stud or the like, as at 219, carried by the housing 166. When, for example, the selector lever 218 is disposed in the position shown in Figure 4, the spring 205 expands and separates the sleeves 201 and 203, a cam section 222 on the shiftable sleeve 203 moving into nested relation with a complementary cam 221 formed on the sleeve 189 that carries the arm 188. It will also be seen from Figure 4 that, in this position of the slidable sleeve 203, the arm 213 is disposed in the path of movement of a pin 223 that is fixed to the arm 171 that is directly connected with the main ram unit control handle 35. The pin 223 is disposed in such position that it clears the arm 188 to which the forward end of the link 192 is connected.

Figure 7:
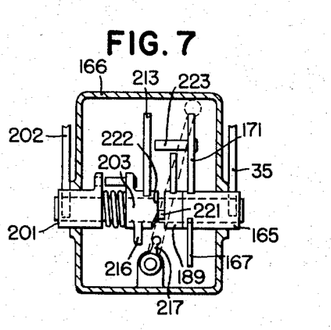
Figure 7 is a view of the selector mechanism of Figures 3 and 4, with the parts arranged in the positions they occupy when the plow and control mechanisms are in their partially raised position, as shown in Figure 5.

In operation, when it is desired to raise the implement into a transport position, the control handle 35 for the main ram unit 28 is moved upwardly toward a vertical position, as shown in full lines in Figure 5. However, about the time the hand lever 35 reaches the position indicated in dotted lines in Figure 5, the pin 223 engages the arm 213 and then forcibly moves the auxiliary ram unit control valve member 79 rearwardly against the action of the spring 162 and irrespective of any position of the valve member 79 that would otherwise be required by the position of the pitch-compensating bell cranks 141 and 153 and associated parts, because of the lost motion at 158—159. It will be understood that by shifting the valve member 79 rearwardly fluid is caused to be directed under pressure into the front end of the cylinder 127, causing the auxiliary ram unit 70 to extend, thus increasing the effective length of the upper link 14, of which the ram unit 70 forms the principal part, thus tilting the implement rearwardly and nosing up the plow bottoms so as to facilitate exit from the ground. This position of the parts is illustrated in Figure 5 from which it can be seen that while the action of the links 143 and 144, the bell cranks 141 and 153, and associated equalizing lever 157 is such as to move the auxiliary ram unit valve member 79 forwardly, engagement of the pin 223 with the arm 213 overcomes the pitch-compensating control means and actually holds the valve member 79 in a position directing fluid under pressure into the front end of the ram unit 70. It is, however, not desirable to have the parts remain in this position during transport, for means would have to be provided to by-pass the fluid under pressure and thus permit the pump 34 to continue to operate after the auxiliary ram unit 70 has been completely extended. Therefore, as best shown in Figures 3, 4 and 7, the cams 221 and 222 are formed and located on the sleeves 189 and 203 so that as the implement reaches and passes beyond the position shown in Figure 5, the resulting rearward movement of the link 192, connected with the rockshaft arm 37, swings the arm 188 and sleeve 189 in a counterclockwise direction to cause the cam 221 to engage the cam 222 and force the latter against the action of the spring 205 and toward the control handle sleeve 201 by an amount that is sufficient to free the arm 213 from contact with the pin 223. Thereupon the spring 162 associated with the auxiliary ram unit control member 79 immediately expands and shifts the member 79 in a direction to remove fluid from the front end of the cylinder and direct it to the rear end, thus retracting the auxiliary ram unit 70 and tilting the implement forwardly, substantially into the position shown in Figure 6, at which time all the valves have been returned to their neutral positions and the demand valve has opened to relieve pressure in the pump discharge conduits.

The forward tilting of the implement in its completely raised position, as shown in Figure 6, has the advantage that, in the case of relatively long implements, such as a three-bottom plow, for example, a transport position including "kick-up" of the rear end of the implement is provided so that the outfit may travel across ditches and the like without having the rear end of the implement contact the ground which under certain conditions might stall the outfit.

Figure 8:
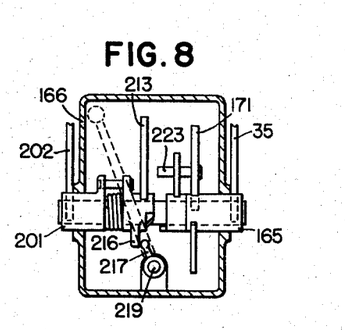
Figure 8 is a view similar to Figure 7, showing the parts of the selector mechanism when they are arranged to provide for separate control manually of the auxiliary cylinder of the tractor power lift.

The provision of the selector mechanism shown in Figures 3–8, has the further advantage that by disposing the selector lever 218 in a position holding the sleeves 201 and 203 in connection with one another (Fig. 8) the ram unit 70 is made available for any kind of independent use, being under the sole control of the handle 202. With the parts arranged in this condition, the tractor is made available for use with implements that do not require pitch compensation, in which case the link 144 is disconnected and removed. When the parts are positioned as shown in Figure 8, the arm 213 is disconnected from the pin 223 and is disconnected from the handle 35. Thus, the parts 213, 233, and 218 constitute a means for disconnecting the auxiliary ram unit valve means 79 from the hand lever 35. By disconnecting the pitch-compensating link 144, the part 18a on the implement is no longer effective to shift the valve 79, and hence the latter can then be arranged as just described, so as to be controlled by the hand lever 202. In making this change, the main ram unit 28 which is controlled by the hand lever 35, the position-responsive part 37 on the rockshaft 25, and the load-responsive part 38 that forms a part of the draft-responsive mechanism 40, is not affected.

Under conditions where a relatively large nose-up or exit-angle is not desirable or necessary when raising the implement into its transport position, the above-described means for overriding the pitch-compensating mechanism and providing for rearward tilting of the implement as the latter approaches raised position may be eliminated, thus simplifying the mechanism. Figure 10 illustrates this construction. As will be seen from this figure, the sleeve 203a is provided with a short pin 210a and is further provided with a pair of spaced apart abutments 216a disposed on opposite sides of the arm 217 carried on the selector lever 218. The cams 221 and 222 have been eliminated, along with the spring 205 and the abutment pin 223. Also, the sleeve 189 and associated arm 188 may be omitted and the link 192 (Figure 1) connected directly to the associated link 187. Neither the slot 159 nor spring 162 on the valve spool 79 is required with this arrangement.

With this arrangement, the tilted position of the implement is always under the control of the pitch-compensating mechanism, with the result that the implement is tilted nose up to a lesser degree as it leaves the ground. As the implement continues to be lifted the auxiliary ram unit 70 gradually shortens until it reaches transport position. The transport position is the same as in the system previously described.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention. For example, where, for purposes of illustration, we have shown the pitch-compensating cylinder as connected in or forming the principal portion of the upper link of the three-point link system, the pitch-compensating cylinder could be incorporated in the lower links or the pitch-compensating cylinder could be placed in the implement structure and connected to oscillate the mast with respect to the implement frame, or a hitch in the form of an articulated drawbar could be provided, with the pitch-compensating cylinder connected between the drawbar sections so as to change the angle of one section with respect to the other.

What we claim, therefore, and desire to secure by Letters Patent is:

1. For use with an implement adapted to be connected for vertical pivoting movement with a tractor of the type having power means that includes a ram unit flexibly connected with the tractor and movable optionally to different positions, a source of fluid pressure on the tractor, and valve means controlling the flow of fluid between said ram unit and said source: the improvement comprising means on the implement and the tractor to receive said ram unit and so related to the axis of said pivoting movement that extension and retraction of said ram unit serves to tilt said implement in a generally fore-and-aft direction about said axis, an operating linkage connected with said implement and with said valve means and movable in response to changes in the position of said implement relative to the tractor, and means connecting said operating linkage with said valve means, whereby the implement is tilted to compensate for pitching of the tractor, as when passing over uneven ground.

2. For use with an implement having a generally vertically extending mast structure adapted to be shiftably connected through draft linkage with a tractor of the type having power lift means including a rockshaft connected through said linkage to raise and lower said implement, a main ram unit on the tractor for rocking said rockshaft, an auxiliary ram unit flexibly connected with the tractor and movable optionally to different positions, a source of fluid pressure on the tractor, and first and second valve means controlling the flow of fluid between said main and auxiliary ram units, respectively, and said source: the improvement comprising means on the implement and the tractor to receive said auxiliary ram unit and so related to said draft linkage that extension and retraction of said auxiliary ram unit serves to tilt said implement in a generally fore-and-aft direction, and means including a follow up linkage connected between said first and second valve means for changing the effective length of said auxiliary ram unit in response to movement of said first valve means.

3. For use with an implement having a generally vertically extending mast structure adapted to be shiftably connected through draft linkage with a tractor of the type having power lift means including a rockshaft connected through said linkage to raise and lower said implement, a main ram unit on the tractor for rocking said rockshaft, an auxiliary ram unit flexibly connected with the tractor and movable optionally to different positions, a source of fluid pressure on the tractor, and first and second valve means controlling the flow of fluid between said main and auxiliary ram units, respectively, and said source: the improvement comprising means on the implement and the tractor to receive said auxiliary ram unit and so related to said draft linkage that extension and retraction of said auxiliary ram unit serves to tilt said implement in a generally fore-and-aft direction, operating linkage connected with said implement and with said second valve means for operating said auxiliary ram unit in response to changes in the position of said implement relative to the tractor, said operating linkage including an equalizing lever, a hand lever, a connection between said equalizing lever and said hand lever, and a second connection between said hand lever and said first valve means for causing movements of said hand lever to extend and retract said auxiliary ram unit in addition to actuation of said first valve means.

4. The combination with a tractor of the type having main and auxiliary ram units, main and auxiliary valve means respectively for said units, and main and auxiliary hand levers for respectively operating said valve means, of an agricultural implement including ground-working means, means on the implement and tractor for receiving the auxiliary ram unit, whereby operation of the latter in one direction or the other serves to tilt the implement relative to the tractor in a generally fore-and-aft direction, a part movable in response to tilting of said implement, disconnectible means connecting the auxiliary valve means with the auxiliary hand lever, means for connecting the auxiliary valve means with the main hand lever, and an equalizer lever connected between said auxiliary valve means, said part and said main hand lever.

5. In an automatic control for a tractor propelled implement having ground-working means, the combination of a source of fluid pressure, a first hydraulic ram connected to raise and lower said ground-working means, a first part connected to move with said first ram, a second hydraulic ram connected to tilt said ground-working means in a fore-and-aft direction, first and second valve means respectively controlling said rams, manually controlled means for operating said first ram, a second part connected to move with said ground-working means when the latter tilts relative to the tractor, a draft-responsive unit, a first lever having one portion connected with said unit and another portion connected with said manually controlled means, a second lever connected to operate said first valve means and having movable connections with said first lever and said first part, and a third lever connected at one portion with said second valve means and having movable connections with said manually controlled means and said second part.

6. In an implement and tractor outfit, the combination with a tractor having a pair of hydraulic rams, a source of operating fluid therefor, a draft responsive unit, a pair of separate valve means respectively connected with and for controlling said rams, a manually operated lever, a pair of parts connected respectively to move with said rams as the latter are extended and retracted, an equalizer lever connected at one portion with one of said parts and at other portions with one of said valve means and said manually operated lever, and a second equalizer lever connected at one portion with said draft responsive unit, at another portion with said manually operated lever and at other portions with the other of said valve means and the other of said parts.

7. Control mechanism for an agricultural implement having ground-working means and adapted to be connected with a tractor having power actuated means including a main ram unit and an auxiliary ram unit, comprising the combination with a draft-responsive member connected between the tractor and said ground-working means, main and auxiliary valve means respectively for said ram units, a main hand lever, an equalizing lever connected at one portion with said main hand lever and at another portion with the main valve means and the draft responsive member, and an auxiliary hand lever connected with the auxiliary valve means for controlling said auxiliary ram unit, of a selector unit for optionally connecting said auxiliary valve means with said main hand lever, a part connected with said ground-working means to move therewith as said ground-working means tilts in a generally fore-and-aft direction relative to the tractor, a second equalizer lever connected at one portion with said auxiliary valve means and at another portion with said main hand lever and said part.

8. Control mechanism for an agricultural implement having ground-working means and adapted to be connected with a tractor having power actuated means including a main ram unit and an auxiliary ram unit, said control mechanism comprising main and auxiliary valve means respectively for said ram units, a member connected with the main valve means, a part connected with the implement and movable as the ground-working means tilts in a generally fore-and-aft direction relative to the tractor, an operative connection between said part and the auxiliary valve means, said connection including yieldably connected, relatively movable parts, means connecting said main ram unit with said implement for raising and lowering the ground-working means, and means on said member connectible with said auxiliary valve means, when said member is moved into a position to raise said ground-working means, for moving the auxiliary valve means independently of said operative connection, the yieldably connected parts yielding to accommodate said independent movement of said auxiliary valve means.

9. Control mechanism as defined in claim 8, further characterized by said means connectible with said auxiliary valve means comprising a stop on said member engageable with said auxiliary valve means when said member is moved into a position for causing said main ram unit to move said ground-working means into its fully raised position.

10. Control mechanism as defined in claim 8, further characterized by said yieldably connected, relatively movable parts including a first part on said auxiliary valve means, a second part movable with respect thereto, and a spring acting between said last mentioned parts, said spring yielding to accommodate movement of said auxiliary valve means by said member.

11. Control mechanism for an agricultural implement adapted to be connected to a tractor of the type having hydraulic power apparatus including a main lifting ram unit, an auxiliary ram unit, and separately movable main and auxiliary valve means respectively for said ram units, said control mechanism comprising a part movably connected with the tractor, means connecting said part with the implement so as to shift said part when said implement tilts in a generally fore-and-aft direction relative to the tractor, a hand lever connected with the main valve means, an equalizing lever having one portion connected with the auxiliary valve means, and fulcrum connections extending between said equalizer lever and said part and hand lever.

12. The invention set forth in claim 11, further characterized by means connected with said hand lever and the auxiliary valve means for operating said auxiliary valve means independently of said part, and means connected to move with said main ram unit and connected with the connection between said hand lever and the auxiliary valve means to restore control of said auxiliary valve means to said tilt-responsive part.

13. The combination with a tractor of the type having main and auxiliary ram units and main and auxiliary valve means respectively for said units, of separately mounted hand main and auxiliary levers connected respectively with said main and auxiliary valve means, an equalizing lever connected at one end with the auxiliary valve means, a connection between the other end of said equalizing lever and the main hand lever, the auxiliary means connecting the valve means with the auxiliary hand lever being disconnectible, and means connecting said auxiliary valve means with the main hand lever.

14. The invention set forth in claim 13, further characterized by a part movably connected with the tractor and having a fulcrum connection with said equalizing lever for controlling the auxiliary valve means in correlation with said main hand lever.

15. Control mechanism for use with a tractor of the type having first and second separately operable ram units, said control mechanism comprising first and second valve means respectively for said units, a hand lever connected to operate one of said valve means, a second hand lever, disconnectible means connecting said second hand lever with the other of said valve means, said disconnectible means including a movable part, and means on said first hand lever for engaging said part when the latter is disconnected from the other hand lever.

16. The invention set forth in claim 15, further characterized by means for shifting said movable part from its connection with the first hand lever, a part movable with one ram unit, and means for operating said shifting means from said last mentioned part.

17. Control mechanism for a tractor-carried, ground-engaging implement, comprising the combination of a hydraulic pump, a remote hydraulic ram unit flexibly connected with said tractor and movable optionally to different positions and fluid-connected to said pump to receive fluid from the pump in any of said positions, means for connecting one end of said unit with the implement and the other end with the tractor, whereby extension and retraction of said unit serves to tilt said implement in a generally fore-and-aft extending plane, valve means controlling said unit, a part connected with said valve means and with said implement, whereby tilting of the latter acts to shift said valve means, means for interrupting the connection between said part and valve means to provide for movement of the latter independently of said part, and a control lever connected with said valve means for moving the latter when it is disconnected from said part.

18. In an implement and tractor organization, the combination of a tractor having a hydraulic power lift unit including a source of fluid pressure and controlling valve means therefor, a ground engaging implement, generally fore-and-aft extending link means connected at its front portion with the tractor and at its rear portion with the implement and also connected to the power lift unit for generally vertical swinging relative to the tractor, a hydraulic ram unit disposed in generally vertically spaced relation from said link means and pivotally connected at its ends with said implement and tractor, respectively, auxiliary valve means connected between said source and said ram unit for controlling the latter, a part connected with said implement and mounted for movement thereby relative to the tractor whenever said implement shifts generally vertically relative to the tractor, and a connection between said part and said auxiliary valve means for operating the latter so as to extend said ram unit and thereby tilt the implement in a generally fore-and-aft direction whenever the implement is shifted vertically in one direction, and a control member connected with said auxiliary valve means for optionally operating said auxiliary valve means from a source separate from said part.

19. Control mechanism for an agricultural implement having ground-working means and adapted to be connected with a tractor having power actuated means including a main ram unit and an auxiliary ram unit, comprising the combination of a draft-responsive member connected between the tractor and said ground-working means, main and auxiliary valve means respectively for said ram units, a first equalizing lever connected at one end with the main valve means, a part movable on the tractor in response to tilting of the implement relative to the tractor, a second equalizing lever fulcrumed on said part and having one end connected with the auxiliary valve means, a hand lever, a third equalizing lever, means connecting one end of the third lever with said draft responsive means, means connecting the other end of said third equalizing lever with said hand lever, and means connecting the intermediate portion of said third equalizing lever with said first equalizing lever.

20. Control mechanism for an agricultural implement having ground-working means and adapted to be connected with a tractor having power actuated means including a main ram unit and valve means therefor, said control means comprising a hand lever, draft-responsive means connected between the tractor and the ground-working means, a part movable in response to movement of said ram unit, an equalizing lever connected at its ends with said hand lever and said draft-responsive means, respectively, a second equalizer lever connected at its ends with said part and said valve means, and means connecting an intermediate portion of said equalizer lever with said first equalizer lever.

21. In an implement and tractor organization, the combination of a tractor having a hydraulic power lift unit including a source of fluid pressure and controlling valve means therefor, a ground-engaging implement connected with the tractor for vertical movement and for tilting movement in a generally fore-and-aft direction, means connecting the implement to the power lift unit for vertical adjustment of said implement by said unit, a hydraulic ram unit connected at its ends with the tractor and implement, respectively, a part connected with said implement and mounted for movement thereby relative to the tractor whenever said implement shifts generally vertically relative to the tractor, a connection between said part and said valve means for operating the latter so as to tilt the implement in a generally fore-and-aft direction whenever the implement is shifted vertically, yielding means incorporated in said last mentioned connection, whereby said valve means may be moved in a direction opposite to that in which the valve means is moved by said part, and overriding means connected with said valve means to move the latter in said opposite direction.

22. Control mechanism for an agricultural implement having ground-working means and adapted to be adjustably connected with a tractor having power lift means including a main ram unit for raising and lowering said implement between ground-working and transport positions and for adjusting the working depth of said ground-working means in said working position and an auxiliary ram unit for tilting the implement selectively fore-and-aft to cause the ground-working means to run respectively nose up and nose down relative to the ground, said control mechanism comprising a main valve and an auxiliary valve respectively for said ram units, a control member connected to the main valve and movable through a working range to cause the main ram unit to adjust the depth of the ground-working means and movable beyond said range to a raise position to cause said main ram unit to lift said implement to a transport position, a signal part connected with the implement and movable upon tilting thereof when the tractor pitches relative to the implement, an operative connection between said part and the auxiliary valve for positioning the latter in response to movement of said part to cause the auxiliary ram unit to correctively tilt the ground-working means nose down when the tractor pitches upwardly and nose up when the tractor pitches downwardly, said connection including relatively movable parts and a spring normally holding said parts in operatively related positions, means on the control member engageable with the auxiliary valve when said member is moved to its raised position for over-riding said operative connections to load said spring and to move said auxiliary valve to a position causing the auxiliary ram unit to tilt the ground-working means nose up for exit from the ground, and means operative in response to attainment by the implement of its transport position for releasing the engagement between the control member and the auxiliary valve so that said loaded spring re-positions said auxiliary valve to cause the auxiliary ram unit to tilt the implement nose down in said transport position.

23. Control mechanism for an agricultural implement having ground-working means and adapted to be adjustably connected with a tractor having power lift means including a main ram unit for raising and lowering said implement between ground-working and transport positions and for adjusting the working depth of said ground-working means in said working position and an auxiliary ram unit for tilting the implement selectively fore-and-aft to cause the ground-working means to run respectively nose up and nose down relative to the ground, said control mechanism comprising a main valve and an auxiliary valve respectively for said ram units, a control member connected to the main valve and movable through a working range to cause the main ram unit to adjust the depth of the ground-working means and movable beyond said range to a raise position to cause said main ram unit to lift said implement to a transport position, a signal part connected with the implement and movable upon tilting thereof when the tractor pitches relative to the implement, an operative connection between said part and the auxiliary valve for positioning the latter in response to movement of said part to cause the auxiliary ram unit to correctively tilt the ground-working means nose down when the tractor pitches upwardly and nose up when the tractor pitches downwardly, means on the control member engageable with the auxiliary valve when said member is moved to its raised position for over-riding said operative connection to move said auxiliary valve to a position causing the auxiliary ram unit to tilt the ground-working means nose up for exit from the ground, and means operative in response to attainment by the implement of its transport position for re-positioning said auxiliary value to cause the auxiliary ram unit to tilt the implement nose down in said transport position.

24. Control mechanism for an agricultural implement having ground-working means and adapted to be connected with a tractor having power actuated means including a main ram unit and an auxiliary ram unit, said control mechanism comprising main and auxiliary valve means respectively for said ram units, a member connected with the main valve means, a part connected with the implement and movable as the ground-working means tilts in a generally fore-and-aft direction relative to the tractor, an operative connection between said part and the auxiliary valve means, said connection including yieldably connected, relatively movable parts, means connecting said main ram unit with said implement for raising and lowering the ground-working means, means on said member connectible with said auxiliary valve means, when said member is moved into a position to raise said ground-working means, for moving the auxiliary valve means independently of said operative connection, the yieldably connected parts yielding to accommodate said independent movement of said auxiliary valve means, means connected with the auxiliary valve means for reversing same after said independent movement thereof by said member, and means connected with the implement and the auxiliary valve means and operative in response to raising of the implement for incurring reversing of said auxiliary ram unit valve means.

25. Control mechanism for a tractor-carried, ground-engaging implement, comprising the combination of a power source, a remote power unit flexibly connected with said tractor and power source to receive power from the source in a number of different positions relative to the tractor, means for connecting one end of said unit with the implement and the other end with the tractor, whereby operation of said unit serves to tilt said implement in a generally fore-and-aft extending plane, control means controlling said unit, a part connected with said control means and with said implement, whereby tilting of the latter acts to operate said control means, means for interrupting the connection between said part and control means to provide for movement of the latter independently of said part, and a control lever connected with said control means for moving the latter when it is disconnected from said part.

26. In an implement and tractor organization, the combination of a tractor having a power source, a ground-engaging implement connected with the tractor for vertical movement and for tilting movement in a generally fore-and-aft direction, a power-operated unit connected to the tractor power source and including relatively movable members connected with the tractor and implement, respectively, a part connected with said implement and mounted for movement thereby relative to the tractor whenever said implement shifts generally vertically relative to the tractor, control means for energizing the power-operated unit, a connection between said part and said control means for operating the latter so as to tilt the implement in a generally fore-and-aft direction whenever the implement is shifted vertically, yielding means incorporated in said last mentioned connection, whereby said control means may be moved in a direction opposite to that in which the control means is moved by said part, and overriding means connected with said control means to move the latter in said opposite direction.

27. The combination with a tractor of the type having main and auxiliary ram units, main and auxiliary valve means respectively for said units and main and auxiliary hand levers for respectively operating said valve means, of an agricultural implement including ground-working means and connected to the tractor and to the main ram unit for adjustment by said main ram unit under the control of the main valve means and main lever, means on the implement and tractor for receiving the auxiliary ram unit, whereby operation of the latter in one direction or the other serves to tilt the implement relative to the tractor in a generally fore-and-aft direction as distinguished from adjustment by the main ram unit, a part movable in response to tilting of said implement, disconnectible means connecting the auxiliary valve means with the auxiliary hand lever, and means connecting said auxiliary valve means with said part for operating said auxiliary valve means independently of the main valve means.

28. Control mechanism for an agricultural implement having ground-working means and adapted to be connected to a tractor of the type having hydraulic power apparatus including a main lifting ram unit connected to and for raising and lowering the ground-working means, an auxiliary ram unit, separately movable main and auxiliary valve means respectively for said ram units, and a draft responsive mechanism connected with the main valve means for operating the latter to cause the main ram unit to raise and lower said ground-working means in response to changes in the amount of draft, said control mechanism comprising means for connecting said auxiliary ram unit between the implement and tractor for tilting said implement in a generally fore-and-aft direction, a part connected to move with said implement as the latter is tilted, and an equalizer lever connected between the auxiliary valve means and said part, whereby the auxiliary ram unit acts to control the tilting of the implement relative to the tractor.

References Cited in the file of this patent

UNITED STATES PATENTS

| | | |
|---|---|---|
| 2,437,875 | Chambers et al. | Mar. 16, 1948 |
| 2,455,727 | Bunting | Dec. 7, 1948 |
| 2,755,721 | Rusconi | July 24, 1956 |
| 2,764,923 | Morgen | Oct. 2, 1956 |

FOREIGN PATENTS

| | | |
|---|---|---|
| 1,068,687 | France | June 30, 1954 |